US010176004B2

(12) United States Patent
Gardner et al.

(10) Patent No.: US 10,176,004 B2
(45) Date of Patent: Jan. 8, 2019

(54) WORKLOAD-AWARE LOAD BALANCING TO MINIMIZE SCHEDULED DOWNTIME DURING MAINTENANCE OF HOST OR HYPERVISOR OF A VIRTUALIZED COMPUTING SYSTEM

(71) Applicant: International Business Machines Corporation, Armonk, NY (US)

(72) Inventors: Darryl E. Gardner, Newark, CA (US); Manish Gupta, New Delhi (IN); Manoj Palaniswamy Vasanthakumari, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 14/543,923

(22) Filed: Nov. 18, 2014

(65) Prior Publication Data

US 2016/0139946 A1    May 19, 2016

(51) Int. Cl.
  *G06F 9/455*  (2018.01)
  *G06F 9/50*  (2006.01)

(52) U.S. Cl.
  CPC ........ *G06F 9/45558* (2013.01); *G06F 9/5077* (2013.01); *G06F 9/5088* (2013.01); *G06F 2009/4557* (2013.01)

(58) Field of Classification Search
  CPC ......... G06F 9/45558; G06F 2009/4557; G06F 9/5077; G06F 9/5088
  See application file for complete search history.

(56) References Cited

U.S. PATENT DOCUMENTS 8,099,487 B1 * 1/2012 Smirnov ............. G06F 11/3495
                                                    709/223
8,589,555 B2   11/2013 Chen et al.
(Continued)

FOREIGN PATENT DOCUMENTS

CN         102713893 A      10/2012

OTHER PUBLICATIONS

Hu et al., "A Quantitative Study of Virtual machine Live Migration", CAC'13, Aug. 5-9, 2013, Miami, Florida, 2013 ACM, 10 pages, http://people.clarkson.edu/~jmatthew/publications/cac2013_livemigration.pdf.

(Continued)

*Primary Examiner* — Emerson C Puente
*Assistant Examiner* — Jonathan R Labud
(74) *Attorney, Agent, or Firm* — Michael O'Keefe

(57) ABSTRACT

A computer-implemented method for computing an optimal plan for maximizing availability of the workload balancing of a virtual computing device, in the event of maintenance of the virtual computing device, is provided. The computer-implemented method comprises determining a workload placement plan that migrates a plurality of virtual machines of the virtual computing device to at least one location of a plurality of hypervisors. The computer-implemented method further comprises receiving input parameters for computing the workload placement plan for migrating the plurality of virtual machines. The computer-implemented method further comprises determining the workload placement plan that forms the basis for migrating the plurality of virtual machines, within the virtual computing device, for maximizing operating objectives of the virtual computing device.

14 Claims, 6 Drawing Sheets

(56) References Cited

U.S. PATENT DOCUMENTS

| | | | |
|---|---|---|---|
| 2003/0083919 A1* | 5/2003 | Hammann | G06Q 10/06 705/7.25 |
| 2004/0244001 A1* | 12/2004 | Haller | G06F 9/505 718/100 |
| 2008/0222644 A1* | 9/2008 | Richards | G06F 3/0605 718/104 |
| 2011/0289205 A1* | 11/2011 | Hansson | G06F 9/5077 709/224 |
| 2012/0096461 A1 | 4/2012 | Goswami et al. | |
| 2012/0324073 A1 | 12/2012 | Dow et al. | |
| 2012/0324112 A1 | 12/2012 | Dow et al. | |
| 2013/0054813 A1 | 2/2013 | Bercovici et al. | |
| 2013/0055262 A1 | 2/2013 | Lubsey et al. | |
| 2013/0111475 A1 | 5/2013 | Govil et al. | |
| 2013/0191543 A1 | 7/2013 | Abbondanzio et al. | |
| 2013/0227566 A1* | 8/2013 | Higuchi | G06F 9/45533 718/1 |

OTHER PUBLICATIONS

Voorsluys et al., "Cost of Virtual Machine Live Migration in Clouds: A Performance Evaluation", CloudCom 2009, LNCS 5931, pp. 254-265, 2009, © Springer-Verlag Berlin Heidelberg 2009, http://link.springer.com/chapter/10.1007/978-3-642-10665-1_23.

Ma et al., "Distributed Load Balancing Allocation of Virtual Machine in Cloud Data Center", 2012 IEEE, pp. 20-23.

Bobroff et al., "Dynamic Placement of Virtual Machines for Managing SLA Violations", 2007 IEEE, IBM T.J. Watson Research Center, pp. 119-128.

Jo et al., "Efficient Live Migration of Virtual Machines Using Shared Storage *", VEE'13, Mar. 16-17, 2013, Copyright © 2013 ACM, 10 pages, http://dl.acm.org/citation.cfm?id=2451524.

Ajila et al., "Efficient Live Wide Area VM Migration with IP Address Change Using Type II Hypervisor", IEEE IRI 2013, Aug. 14-16, 2013, San Francisco, California, USA, pp. 372-379, http://ieeexplore.ieee.org/xpl/login.jsp?tp=&arnumber=6642495&url=http%3A%2F%2Fieeexplore.ieee.org%2Fxpls%2Fabs_alljsp%3Farnumber%3D6642495.

Pending U.S. Appl. No. 14/150,965, entitled: "Physical Resource Management", filed Jan. 9, 2014.

Li et al., "Informed Live Migration Strategies of Virtual Machines for Cluster Load Balancing *", E. Altman and W. Shi (Eds.): NPC 2011, LNCS 6985, pp. 111-122, 2011, © IFIP International Federation for Information Processing 2011, http://link.springer.com/chapter/10.1007/978-3-642-24403-2_9.

Lloyd et al., "Performance Modeling to Support Multi-Tier Application Deployment to Infrastructure-as-a-Service Clouds", Department of Computer Science, Department of Civil and Environmental Engineering, Colorado State University, Fort Collins, USA, pp. 1-8.

Xu et al., "Smart-DRS : A Strategy of Dynamic Resource Scheduling in Cloud Data Center", 2012 IEEE International Conference on Cluster Computing Workshops, pp. 120-127, IEEE Computer Society.

Chen et al., "VCAE: a Virtualization and Consolidation Analysis Engine for Large Scale Data Centers", 2010 Fourth IEEE International Conference on Self-Adaptive and Self-Organizing Systems, IEEE Computer Society, pp. 1-10.

Gulati et al., "VMware Distributed Resource Management: Design, Implementation, and Lessons Learned", pp. 45-64, : http://http://labs.vmware.com/academic/publications/gulati-vmtj-spring2012.

* cited by examiner

WORKLOAD-AWARE LOAD BALANCING TO MINIMIZE SCHEDULED DOWNTIME DURING MAINTENANCE OF HOST OR HYPERVISOR OF A VIRTUALIZED COMPUTING SYSTEM

TECHNICAL FIELD OF INVENTION

The present invention relates generally to the field of virtual computing systems, and more particularly to workload balancing of virtual machines, of a virtual computing system, based on operating redundancy of the virtual machines, and during maintenance of hypervisors of the virtual computing systems.

BACKGROUND

In system virtualization, multiple virtual computing systems are created within a single physical computing system. The physical system can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically a hypervisor technology. Hypervisors, also called, virtual machine managers (VMMs), use a thin layer of code in software or firmware to achieve fine-grained, dynamic resource sharing, within virtual computing systems. For example, hypervisors are the primary technology for system virtualization, because they provide the greatest level of flexibility in how virtual resources are defined and managed.

SUMMARY

According to one embodiment of the present invention, a computer-implemented method for computing an optimal plan for rebalancing workload of a virtual computing device, for maximizing availability of the workload, operating on the virtual computing device, in the event of maintenance of a plurality hypervisors, of the virtual computing device, is provided. The computer-implemented method comprises determining a workload placement plan that migrates a plurality of virtual machines of the virtual computing device to at least one location of a plurality of hypervisors during maintenance of the plurality hypervisors of the virtual computing device, based on workload structure and redundancy information of the plurality of virtual machines and business priority information of the workload structure, of the virtual computing device. The computer-implemented method further comprises receiving input parameters for computing the workload placement plan for migrating the plurality of virtual machines. The computer-implemented method further comprises determining the workload placement plan that forms basis for migrating the plurality of virtual machines, within the virtual computing device, for maximizing operating objectives of the virtual computing device. The computer implemented method further comprises determining resource overcommit thresholds for the operating objectives of the virtual computing device.

According to another embodiment, a computer system for computing an optimal plan for maximizing availability of the workload balancing of a virtual computing device, in the event of maintenance of a virtual computing device, is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions program instructions to determine a workload placement plan that migrates a plurality of virtual machines of the virtual computing device to at least one location of a plurality of hypervisors during maintenance of the plurality hypervisors of the virtual computing device, based on workload structure and redundancy information of the plurality of virtual machines and business priority information of the workload structure, of the virtual computing device. The computer system further comprises program instructions program instructions receive input parameters for computing the workload placement plan for migrating the plurality of virtual machines. The computer system further comprises program instructions to program instructions to determine the workload placement plan that forms basis for migrating the plurality of virtual machines, within the virtual computing device, for maximizing operating objectives of the virtual computing device. The computer-implemented method further comprises program instructions to determine resource overcommit thresholds for the operating objectives of the virtual computing device.

According to yet another embodiment, a computer program product for computing an optimal plan for rebalancing workload of a virtual computing device, for maximizing availability of the workload, operating on the virtual computing device, in the event of maintenance of a plurality hypervisors, of the virtual computing device, of the virtual computing device, is provided. The computer program product comprises one or more computer-readable tangible storage devices and program instructions stored on at least one of the one or more storage devices. The computer program product further comprises program instructions to determine a workload placement plan that migrates a plurality of virtual machines of the virtual computing device to at least one location of a plurality of hypervisors during maintenance of the plurality hypervisors of the virtual computing device, based on workload structure and redundancy information of the plurality of virtual machines and business priority information of the workload structure, of the virtual computing device. The computer program product further comprises program instructions receive input parameters for computing the workload placement plan for migrating the plurality of virtual machines. The computer program product further comprises program instructions to determine the workload placement plan that forms basis for migrating the plurality of virtual machines, within the virtual computing device, for maximizing operating objectives of the virtual computing device. The computer program product further comprise program instructions to determine resource overcommit thresholds for the operating objectives of the virtual computing device.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

DETAILED DESCRIPTION

Figure 1:
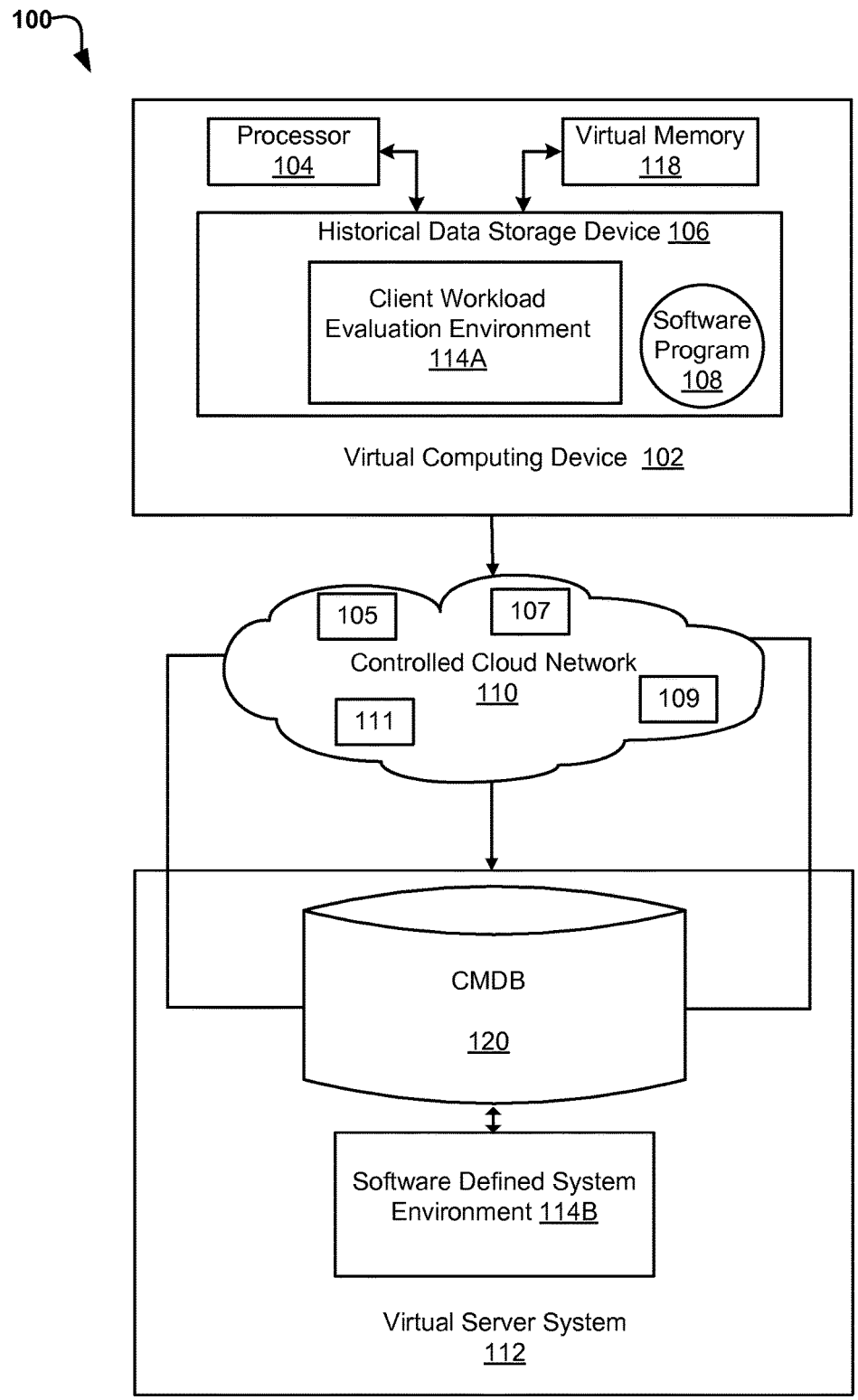
FIG. 1 is an integrated virtual systems environment 100, for computing an optimal plan, for maximizing the availability of workload structure of the integrated virtual systems environment, according to embodiments.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Quarterly system maintenance activities are generally performed in integrated server systems, such as, servers, or storage management systems. Such integrated server typically includes hypervisors, for allocating, or deallocating resources to the integrated server systems. For example, during the maintenance, virtual machines running on the hypervisors are detected for operating redundancy, and as such, they are typically required migration (preferably live) to a plurality of hypervisors of the integrated server systems. For example, upgrades and security patches, for the integrated server systems, are typically applied to the hypervisors, as stacks, during the maintenance of the integrated server systems. However, there is a lack in the use of the workload structure, redundancy information, in making decisions for migrating the virtual machines, to the hypervisors, during the maintenance of the integrated server systems.

Embodiment of the present invention generally relates to integrated server systems environments, and more particularly to workload balancing of virtual machines of integrated server systems environments, to minimize scheduled downtime of the integrated server systems environments, during maintenance of a host or hypervisor of the integrated server systems environments.

The embodiments include one or more circuits, or subassemblies of circuits, as well as, a system, or methods of operation for utilizing a workload structure plan of integrated server systems environments, for determining migration of virtual machines, during the maintenance of the integrated server systems environments. For example, virtual machines are migrated to a plurality of hypervisors, of the integrated server systems environments, based on detection of redundant operations of the virtual machines, and whereby, the virtual machines are migrated to the plurality of hypervisors that meets quality service (QoS) requirements, for maximizing availability of the workload structure plan, during the migration.

For example, the workload structure plan of the present invention maximizes the availability of all the affected workloads, during the maintenance of the hypervisors of the integrated server systems environment. The workload structure plan is computed by solving an optimization problem that considers capacity and performance attributes for virtual machines, based on performance characteristics of the virtual machines, during the maintenance of the hypervisor. The workload structure plan is also based on any possible constraints that might arise during the maintenance of the hypervisor, due to anti-affinity, affinity, licensing, or utilization of resources, of the virtual machines, or other virtual machines of the integrated server systems, or also due to a determination of operating redundancy of the virtual machine.

The present invention may be a system, a method, and/or a computer program product. The computer program product may include a computer readable storage medium (or media) having computer readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an integrated virtual systems environment 100, for computing an optimal plan, for maximizing the availability of workload structure of the integrated virtual systems environment 100, for performing live migration of virtual machines to a plurality of hosts or hypervisors, based on a decision to migrate the virtual machines, such as, for instance, a detection of operating redundancy of the virtual machines, during maintenance of the hosts or hypervisors, within the integrated virtual systems environment 100, according to embodiments.

It should be appreciated that FIG.1 provides only an illustration of one implementation and does not imply any limitations with regard to the environments in which different embodiments may be implemented. Many modifications to the depicted environments may be made based on design and implementation requirements. For example, the integrated virtual systems environment 100 may also include a plurality of virtual computing device 102 and virtual server system 112, for performing the live migration of virtual machines to a plurality of hosts or hypervisors, within the integrated virtual systems environment 100, only one of which is shown, at least in FIG. 1.

For example, the integrated virtual systems environment 100 may include a virtual computing device 102 with a processor 104 and a historical data storage device 106 that is enabled to run, or execute program instructions of a software program 108. The virtual computing device 102 may also include a client workload evaluation environment 114A, for managing an administrative interface, whereby, the client workload evaluation environment 114A evaluates, or executes a plan for a workload structure, for performing live migration or re-mapping of virtual machines, during maintenance of at least one host or hypervisor, of the integrated virtual systems environment 100, according to embodiments.

The virtual memory 118 of the computer 102 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable mobile computing storage medium that may be used to carry or store desired program code and program data in the form of instructions or data structures and that may be accessed by other components of the virtual computing device 102, for ensuring that display of the interface for managing an administrative interface, by a systems administrator, for evaluating, or executing the plan for the workload structure, during maintenance of at least one host or hypervisor, are adequately configured, based on preferences of a client, or system, for executing the plan for the workload structure.

The integrated virtual systems environment 100 may also include a virtualized server system 112, running a software defined system environment 114B, with a configuration management database (CMDB) 116, which provides a data model, for storage of information of the integrated virtual systems environment 100, based on automatic discovery of data for configuration of items of the integrated virtual systems environment 100, visualization of application dependencies on configuration items, and multicustomer support, for executing the workload structure plan, whereby, as depicted the CMDB 120, is interconnected with the virtual computing device 102, via a controlled cloud network 110, for performing the live migration, or the re-mapping of virtual machines, according to embodiments.

The virtualized server system 112 can also be a stand-alone computer, or alternatively, a computing system utilizing a cluster of computers, for performing the migration of virtual machines, within the integrated virtual systems environment 100. The virtualized server system 112 can also be an independent operating environment that utilizes virtual resources of computing system, within integrated virtual systems environment 100, for performing the re-balancing of workload, based on live migration, or the re-mapping of virtual machines, during maintenance, of at least one host or hypervisor of the virtual machines of virtualized server system 112. For example, the virtual resources can include logical divisions of physical resources, such as processors, memory and input/output adapters. The virtualized server system 112 can also allow multiple types of operating systems, host, or hypervisors to operate within virtual machines on a single server, and also share the physical resources of the virtualized server system 112, for performing the migration, according to embodiments.

The controlled cloud network 110 may include various types of communication networks, such as a wide area network (WAN), local area network (LAN), a telecommunication network, a wireless network, a public switched network and/or a satellite network, or one or more networks of any kind that can provide communication links between various devices and computers connected together within a multi-service cloud management environment, for transmitting information for evaluating, or executing a plan for a workload structure, for performing live migration or re-mapping of virtual machines, during maintenance of at least one host or hypervisor, of the integrated software environment 100, such as, host 105, host 107, host 109, or host 111, whereby, each one of the host 105, host 107, host 109, or host 111 is figured within the cloud management computing network 110 for performing live migration, or re-mapping of virtual machines, to at least one of host 105, host 107, host 109, or host 111, during maintenance of at least one host or hypervisor. The host or the hypervisor can be hosted on the cloud of the controlled cloud network 110, all within, the integrated software environment 100, according to embodiments.

The virtual computing device 102 may communicate with a software defined system environment 114B, running on virtual server system 112, via the controlled cloud network 110, for evaluating, or executing a plan for a workload structure, for performing live migration or re-mapping of virtual machines, during maintenance of at least one host or hypervisor of virtual server system 112.

The controlled cloud network 110 may also include connections, such as wire, wireless communication links, or fiber optic cables. For example, as will be discussed with reference to FIG. 6, virtual server system 112 may include internal components 800a and external components 900a, respectively, and computer 102 may include internal components 800b and external components 900b, respectively.

The virtual computing device 102 may be, for example, physical server system, a laptop, tablet, or notebook personal computer (PC), a desktop computer, a mainframe or mini computer, or a personal digital assistant (PDA), or any other computing system that provides cloud and virtualization software and services, according to embodiments.

The virtual computing device can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for managing an administrative interface, whereby, the client workload evaluation environment 114A evaluates, or executes a plan for a workload structure, for performing the live migration or re-mapping of virtual machines, between the a client workload evaluation environment 114A of virtual computing device and the software defined system environment 114B of virtual server system 112. The historical database storage device 106 of the virtual computing device 102 is any type of storage device, storage server, storage area network, redundant array of independent discs (RAID), cloud storage service, or any type of data storage. The historical database storage device 106 can also be a relational model database server for storing program instructions for evaluates, or executes a plan for a workload structure, in a computing interface of the client workload evaluation environment 114A, for viewing by client, or systems administrator of the client workload evaluation environment 114A.

The virtual server system 112 can be, for example, a mainframe server computer system such as a management server, a web server, or any other electronic device or computing system capable of transmitting data, between virtual server system 112 and virtual computing device 102, for performing the live migration of virtual machines to a plurality of hosts or hypervisors, based on a decision to migrate the virtual machines, such as, for instance, a detection of operating redundancy of the virtual machines, during maintenance of host hypervisor. The virtual system server 112 can also represent a "cloud" of computers interconnected by one or more networks, whereby, the virtual system server 112 is a primary server of a plurality of server computing systems that utilizes clustered computers, when accessed through the controlled cloud network 110, according to embodiments. For example, a cloud computing system can be an implementation of live migration of virtual machines to a plurality of hosts or hypervisors, based on a decision to migrate the virtual machines, within the integrated virtual systems environment 100.

The CMDB 120 is any type of storage device, storage server, storage area network, redundant array of independent discs (RAID), cloud storage service, or any type of data storage for storing information relating on automatic discovery of data for configuration items, of workload structure, of the integrated virtual systems environment 100, visualization of application dependencies on configuration items, and multicustomer support, for executing the plan for the workload structure, for performing the live migration, or the re-mapping of virtual machines, during maintenance of at least one host or hypervisor, of the virtual server system 112, based on a determination to migrate the virtual machines, between hosts, or hypervisors of the virtual server system 112. The CMDB 120 can also be a relational model database server for storing program instructions for performing the live migration, or the re-mapping of virtual machines, during maintenance of at least one host or hypervisor, of the virtual server system 112 within the integrated virtual systems environment 100. The relational model for database management of the live migration, or the re-mapping of virtual machines by CMDB 120, may be based on first-order predicate logic, for storing information pertaining to workload execution, or plan for performing the live migration, or the re-mapping of virtual machines, according to embodiments.

Figure 2:
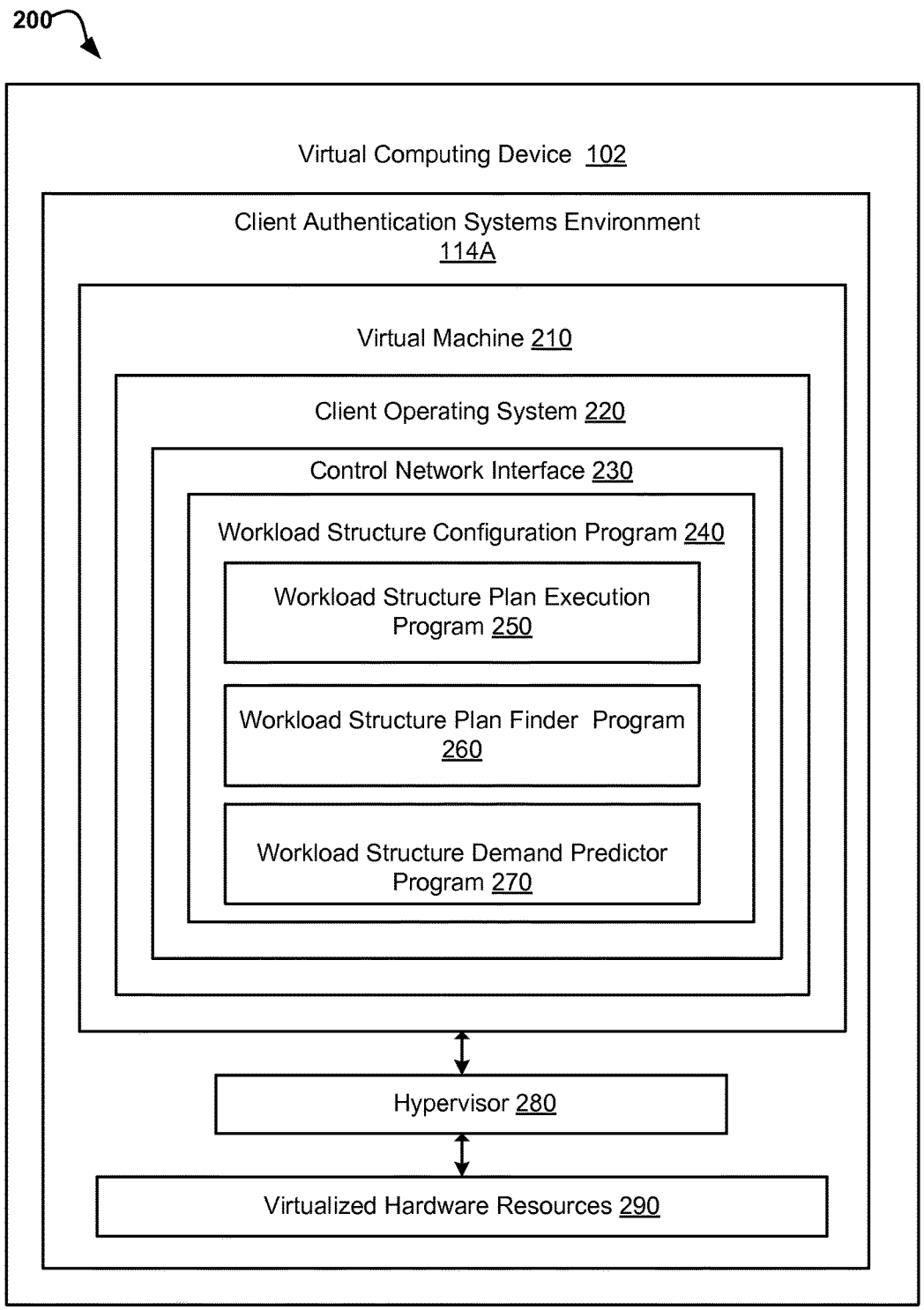
FIG. 2 a functional block diagram illustrating program components and algorithms associated with the client workload evaluation environment 114A, according to embodiments.

Referring now to FIG. 2, a functional block diagram 200 illustrating program components and algorithms associated with the client workload evaluation environment 114A, in accordance with embodiments. The client workload evaluation environment 114A may be a web browser plug-in system application program that provides an administrative user-interface, for configuring, and managing client evaluations, or execution of a plan, for a workload structure of virtual computing device 102, for performing live migration or re-mapping of virtual machines, during maintenance of at least one host or hypervisor, of virtual computing device.

The client workload evaluation environment 114A provides an interface for configuring a plan finder interface component for configuring execution of a workload plan for migrating the virtual machine, whereby, for instance, the plan executor executes commands to implement the workload plan for performing live migration of virtual machines to a plurality of hosts or hypervisors, based on a decision to migrate the virtual machines, such as, for instance, a detection of operating redundancy of the virtual machines, during maintenance of a host or hypervisor of the software system environments, according to embodiments.

The client workload evaluation environment 114A may access the software defined system environment 114B, running on the virtual system server 112, for configuring, and managing client evaluations, or execution of a plan, for a workload structure of virtual computing device 102, for performing the live migration or re-mapping of virtual machines, during maintenance of at least one host or hypervisor of the virtual computing device 102. For example, the client workload evaluation environment 114A may be centralized on the software defined system environment 114B, and also it may be divided between two different components: server-side and client-side.

The software defined system environment 114B, running on virtual system server 112 may interact with the web browser of client workload evaluation environment 114A, for transmission of the user configurations, or systems management, for configuring, and managing client evaluations, or execution of a plan, for a workload structure of virtual computing device 102, whereby, based on the executed plan, a determination can be made to migrate the virtual machines, whereby, the determination is based on detection of operating redundancy of the virtual machines, during maintenance of host hypervisor of client workload evaluation environment 114A.

The client workload evaluation environment 114A may implement workload balancing virtualized computing platform for migration or re-mapping of virtual machines, during maintenance of at least one host or hypervisor of the virtual computing device 102. Also, the client workload evaluation environment 114A may include a hardware virtualization system that enables multiple operating systems, or virtual machines to run or operate simultaneously, and perform operations to configure the executed plan migrate the virtual machines, based on the determination. For example, the client workload evaluation environment 114A includes virtual machine (VM) 210, hypervisor 280, and virtualized hardware resources 290. The client workload evaluation environment 114A may include additional virtual machines, hypervisors and virtualized hardware resources, for workload balancing of resources of the virtual computing device 102, based on migration or re-mapping of VM 210, during maintenance of at least one host or hypervisors of hypervisor 280.

The VM 210 provides a virtualized system application platform program execution of applications in operating (OS) 220, for workload balancing of resources of the virtual computing device 102. The VM 210 utilizes data or information of an external source, or of the user, and generates a virtualized operating platform for the workload balancing of OS 220. Also, the VM 210 may also execute program instructions for displaying the information, or data, in a virtualized data format, for display in the client workload evaluation environment 114A of the virtual computing device 102.

The virtualized hardware resources 290 may include, for instance, virtual processors, virtual disks, virtual memory or virtual network interfaces that are allocated to VM 210 for executing program operations of mobile OS 220. Also, the hypervisor 280 virtualizes virtualized hardware resources 290, and controls processor scheduling and memory partitions for executing program operations of mobile OS 220. Though not depicted, there may be one or more hypervisors of virtualized computing device 102 that are adapted to virtualize hardware resources 290 of virtualized computing device 102. For example, according to at least one embodiment, the hypervisor 280 is a host system of the virtualized computing device 102 that performs standard operating system functions, and manages communications with the virtualized computing device 102. The hypervisor 280 dynamically allocates and deallocates dedicated or shared hardware resources of virtualized hardware resources 290. For example, dynamic allocation and deallocation of virtualized hardware resources 290 allows hypervisor 280 to dynamically redefine all available system resources of virtualized computing device 102, for determining a detection of operating redundancy of the VM 210, during maintenance of hypervisor 280, within, client workload evaluation environment 114A, based on the executed plan, to migrate the VM 210 to other hypervisors 280.

The mobile OS 220 includes control network interfaces 230, which operates to display an interface for configuring a plan finder interface component for configuring execution of a workload plan for migrating the VM 210, whereby the plan executor executes commands to implement the workload plan, for performing the live migration of VM 210 to a plurality of hosts or hypervisors of hypervisor 280. The control network interface 230 may be a mobile web browser application, a standalone mobile web page graphics display application or part of a service that monitors and interacts with a mobile web browser or system configuration application of VM 210, for performing the management of the live migration of VM 210 to a plurality of hosts or hypervisors of hypervisor 260, according to embodiments.

The control network interface 230 includes a workload structure configuration program 240. The workload structure configuration program 240 is a computer program allows a systems administrator to obtain all the input parameters required to compute a VM 210 placement, or migration, during maintenance of hypervisor 280. The workload structure configuration program 240 can also retrieve information, or data, pertaining to the input parameters, for determining redundancy of VM 210, for the migration, either from the user, or from some external source, such as, CMDB 120.

The workload structure configuration program 240 includes workload structure plan execution program 250, workstructure plan finder program 260, and workload structure demand predictor program 270. The workstruture plan execution program 250 provides an administrative interface for receiving an updated workload plan structure, or implementation for obtaining all the input parameters required to compute migration of VM 210, during maintenance of hypervisor 280, according to embodiments. The workstructure plan finder program 260 correlates with external sources, such as, CMDB 120 to provide a system automation of the received input parameters, for determining whether to perform live migration of the VM 210, from one hypervisors, such as, hypervisor 280, to other hypervisors of the integrated virtual systems environment 100, based on the determination to migrate, during maintenance of hypervisor 280. According to embodiments, the workstructure demand predictor program 252 predicts the utilization of the VMs 210, within the integrated virtual systems environment 100, to determine operating redundancy of the VMs. The workstructure demand predictor program 252 also determines which VMs 210 should be kept, and which VM should be stopped, or migrated to another hypervisor 260, during maintenance of the hypervisor 280, according to embodiments.

Figure 3:
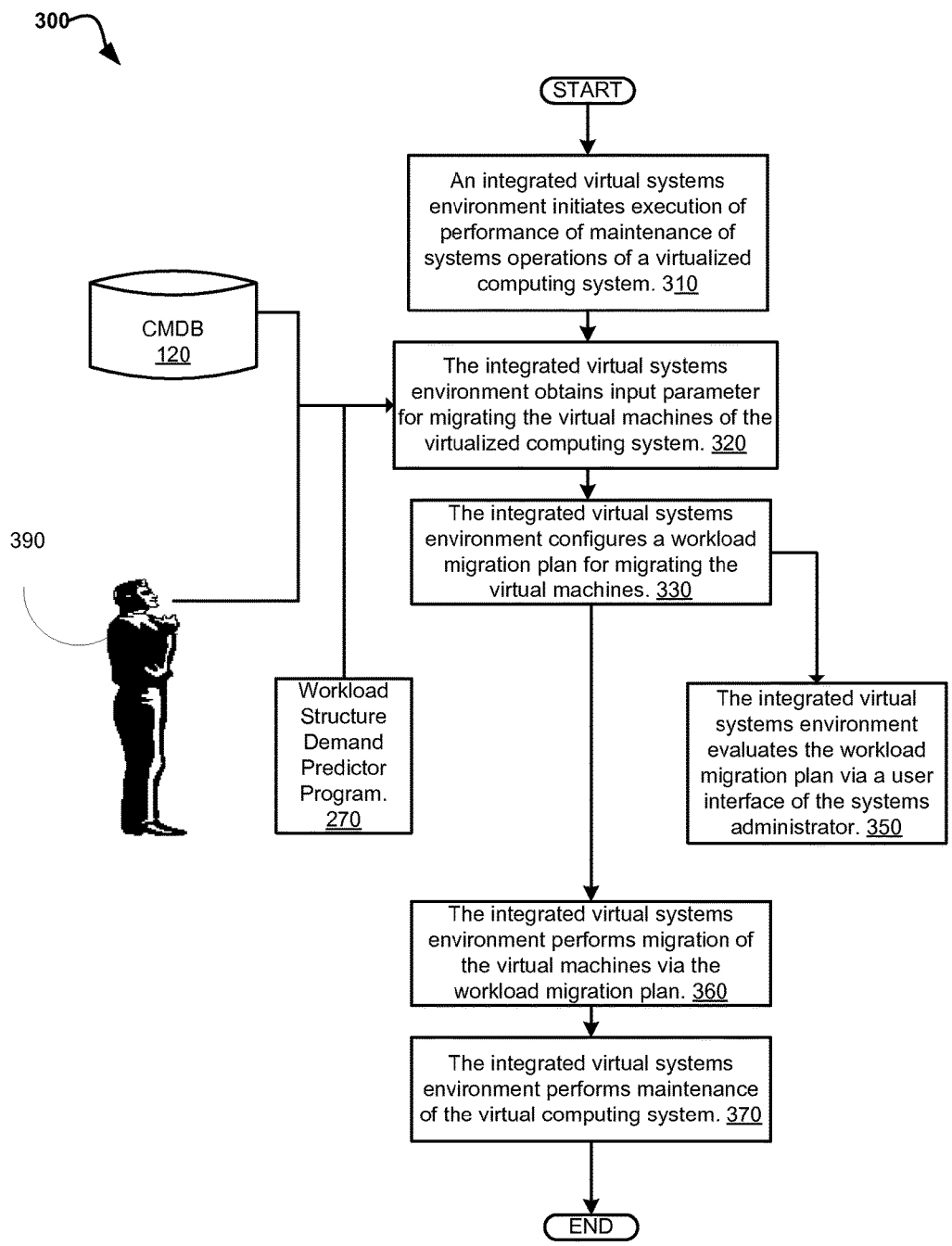
FIG. 3 is an operational flowchart illustrating steps carried out by a program for performing for computing a workload placement plan, according to embodiments.

Referring now to FIG. 3 is an operational flowchart 300 illustrating steps carried out by a program for performing for computing a workload placement plan for obtaining all the input parameters required to compute a VM 210 (FIG. 2) placement, or migration, during maintenance of hypervisor 280 (FIG. 2), whereby the program operations are based on algorithmic computation for executing the workflow placement plan by the workstruture plan execution program 250 (FIG. 2). The flowchart 300 provides an overall flow of integrated virtual systems environment 100. At step 310, virtualized computing device 102 of the integrated virtual systems environment 100 is examined for systems operations during maintenance. Though this method considers only one hypervisor, such as, hypervisor 280 for maintenance, during the placement, or migration of VM 210, during maintenance of hypervisor 280 (FIG. 2), embodiments of the present invention can be based on operating maintenance of a plurality of hypervisors 280, operating within the integrated virtual systems environment 100.

Thereafter, at step 320, the integrated virtual systems environment 100 obtains input required input parameters to compute placement, or migration of VM 210 to hypervisors 280, via workstruture plan execution program 250, when virtualized computing device 102, is down, and not operating, and therefore, cannot operate VM 210, though hypervisor 280, which is in operating maintenance, has the capacity to operate the VM 210. For example, predicted parameters for computation of the new placement, or migration of VM 210 to another hypervisor 280, can be obtained from multiple sources, such as CMDB 120, based on system administrative configuration, by a systems administrator 390, for predicting an executed plan to migrate the VM 210 by work structure demand predictor program 270.

For example, the predicted parameters for utilization of the VM 210 can be used to determine, by work structure demand predictor program 270, a precise plan for outlining which VM 210 should be kept, and which VM 260 migrated.

At step 330, a systems administrator may configure the outlined plan, in the integrated virtual systems environment via client workload evaluation environment 114A. Once the final plan has been created in step 330, the workload placement plan execution program 250 may evaluate the plan, in step 350, based on user defined configuration, in the workload structure plan execution program 250, for evaluating the plan. For example, at step 360, the workload placement plan execution program 250 migrates the VM 260 to hypervisors of the virtualized computing device 102, based on the evaluation in step 350, according to embodiments. At step 370, once, VM 210 is migrated, the integrated server systems environments performs maintenance of virtualized computing device 102, whereby when maintenance is complete, a new workload structure plan may be generated for operating the virtualized computing device 102, according to embodiments.

Figure 4:
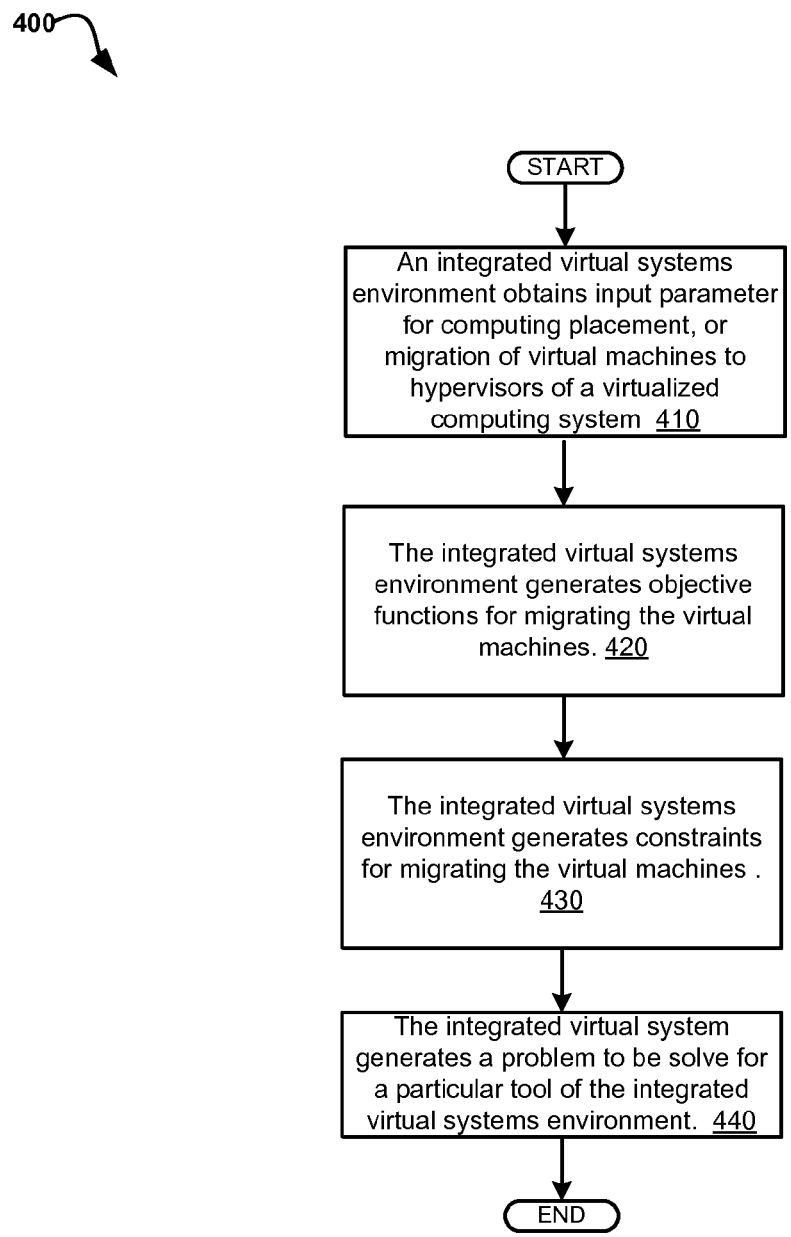
FIG. 4 is an operational flowchart illustrating steps carried out by a program for performing for computing a workload placement plan, according to another embodiment.

Referring now to FIG. 4, is an operational flowchart 400 illustrating steps carried out by a program for performing the computation of a workload structure plan, for migrating a placement, or migration of the VM 210, during maintenance of hypervisor 280 (FIG. 2), according to embodiments. At step 410, the integrated virtual systems environment obtains input parameters required to compute placement, or migration of VM 210 to hypervisors 280. For example, a systems administrator or a human operator can configure the list of parameters for migrating the VM 210 to hypervisors 180, according to embodiments. At step 420, the systems administrator can add or remove objective functions or constraints, of the parameters, respectively. At step 430, the systems administrator can generate constraints of the parameters for migrating the VM 210, based on systems recourses of the integrated virtual systems environment 100. The objective functions and constraints can be represented in terms of input parameters. At step 440, the systems administrator can utilize the generated constraints of the parameters, to address a problem that is solvable, for migrating the VMs 210, within integrated virtual systems environment 100.

Figure 5:
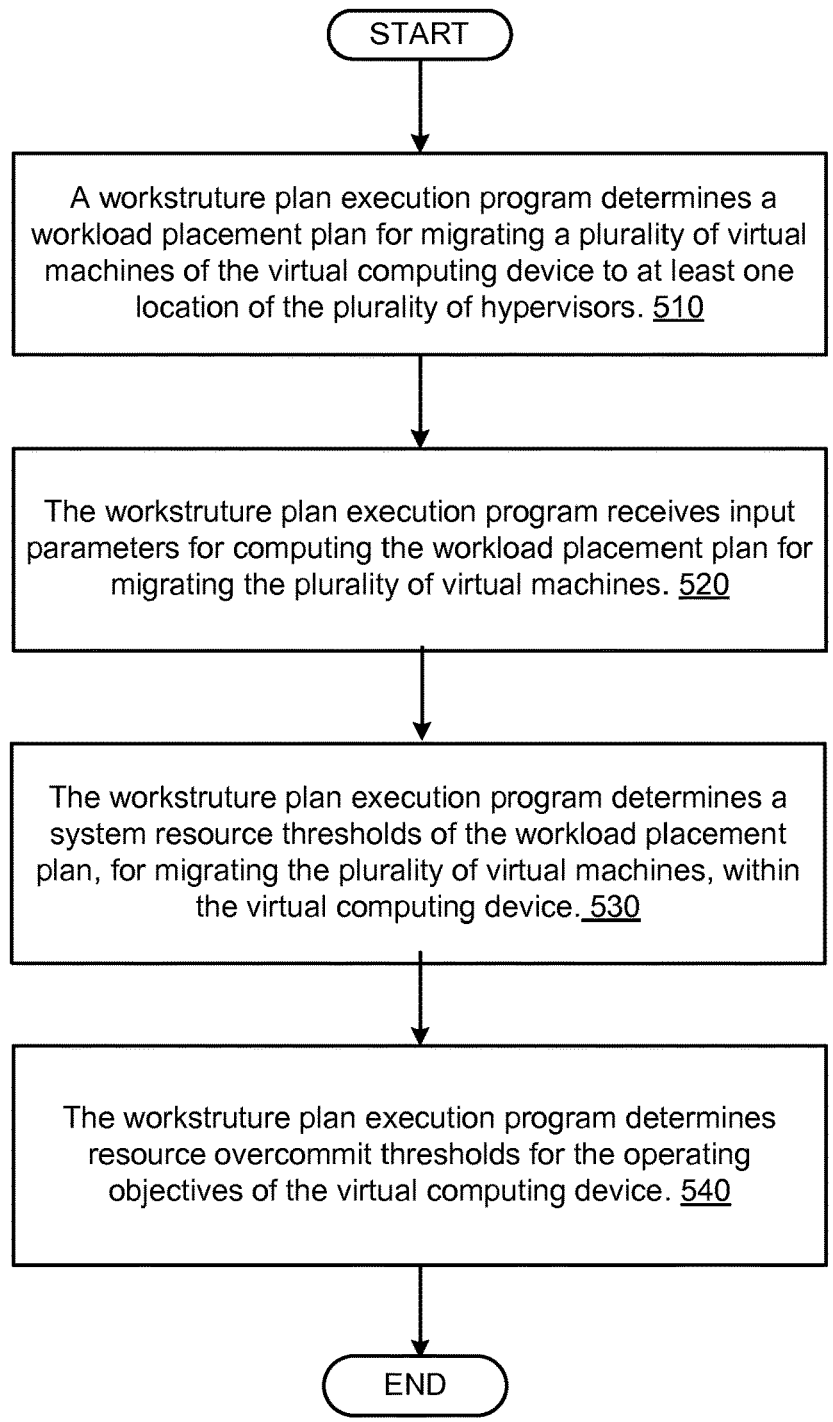
FIG. 5 operational flowchart illustrating steps carried out by a program for performing for computing a workload placement plan, according to yet another embodiment.

Referring now to FIG. 5, is an operational flowchart 500 illustrating steps performed by workstruture plan execution program 250, for computing an optimal plan, for maximizing availability of the workload balancing of a virtual computing device 102, in the event of maintenance of hypervisors 280, of the virtual computing device 102, according to embodiments.

At step 510, the workstruture plan execution program 250 of the integrated virtual systems environment 100 determines a workload placement plan, for migrating VM 210 to the hypervisors 280, during maintenance of the virtual computing device 102. The determination of the workload placement plan, for migration of the VM 210 is based on a detection of redundant operational metrics of the VM 210. For example, the workstruture plan execution program 250 receives inputs of predicted parameters, for the workload placement plan, for migrating the VM 210, wherein the predicted parameters are based on computation of new operating locations of VMs, within the virtual computing device 102. The computation of the new operating locations is performed when the virtual computing device 102 is not operating, and the hypervisors 280 are operating in maintenance operating mode.

Also, the system resource thresholds of the workstruture plan execution program 250, are based on hardware or software resource thresholds of the virtual computing device 102, and operating size of the VM 210 that meet performance requirements of the virtual computing device 102. At step 520, the workstruture plan execution program 250 of the integrated virtual systems environment 100 receives input parameters for computing the workload placement plan for migrating the VM 210. At step 530, the workstruture plan execution program 250 of the integrated virtual systems environment 100 determines system resource thresholds of the workload placement plan for migrating the VM 210, within the virtual computing device 102.

For example, the workload placement plan is based on a workload dependency priority structure for optimizing the optimal plan, for maximizing the workload balancing of the virtual computing device 102, during the maintenance of the plurality of the virtual computing device. The workstruture plan execution program 250 specifies maximum resource overcommitted thresholds, during migration of the plurality of the VM 210 to the hypervisors 280, according to embodiments. At step 540, the workstruture plan execution program 250 determines resource overcommit thresholds for operating objectives of the virtual computing device 102.

Figure 6:
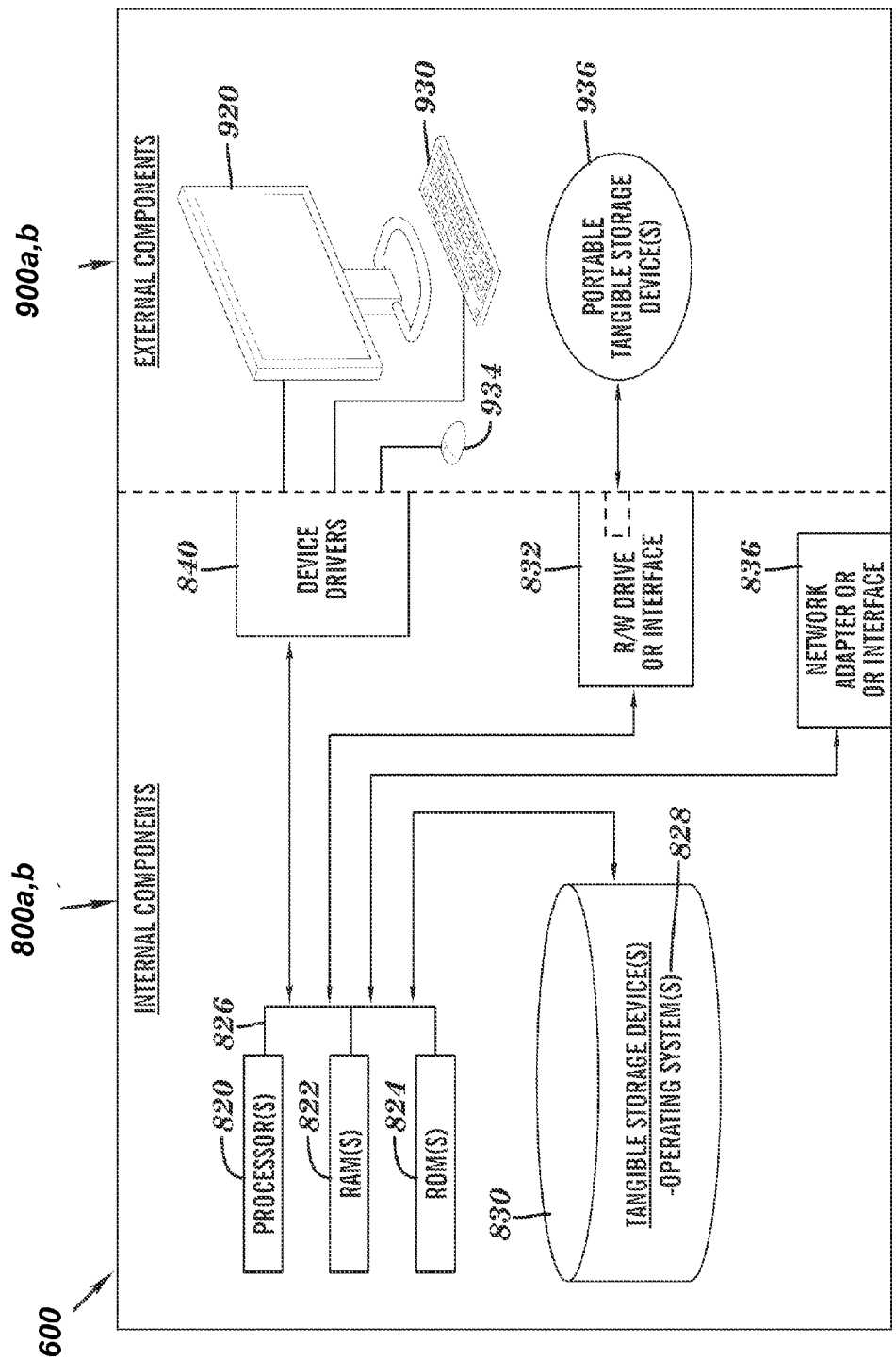
FIG. 6 is a diagram of a computing system, according to embodiments.

FIG. 6 is a block diagram 600 of internal and external components of computers depicted in FIG. 1 in accordance with an illustrative embodiment. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Client workload evaluation environment 114A (FIG. 1), and software defined system environment 114B (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in client computer 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 5, each of the computer-readable tangible storage medium 830 is a magnetic disk storage device of an internal hard drive.

Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 (FIG. 1), such as client workload evaluation environment 114A(FIG. 1) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) and client workload evaluation environment 114A (FIG. 1) in client computer 102 (FIG. 1) and software defined system environment 114B (FIG. 1) can be downloaded to client computer 102 (FIG. 1) and server computer 112 (FIG. 1), respectively from an external computer via a network (for example, the Internet, a local area network or other, wide area network) and respective network adapters or interfaces 836. From the network adapters or interfaces 836, the code software programs 108 (FIG. 1) and client workload evaluation environment 114A (FIG. 1) in client computer 102 (FIG. 1) and software defined system environment 114B (FIG. 1) in server computer 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for computing an optimal plan for rebalancing workload of a virtual computing device, for maximizing availability of the workload, operating on the virtual computing device, in the event of maintenance of a plurality hypervisors, of the virtual computing device to minimize scheduled downtime of an integrated server system environment during maintenance of a host or a hypervisor of the plurality of hypervisors associated with the integrated server system environment, the computer-implemented method comprising the steps of:

determining a workload placement plan that migrates a plurality of virtual machines of the virtual computing device to at least one location of a plurality of hypervisors during maintenance of the plurality hypervisors of the virtual computing device, based on workload structure and redundancy information of the plurality of virtual machines and business priority information of the workload structure, of the virtual computing device, wherein determination of the workload placement plan is based on priority and workload structure for placement of the virtual machines to maximize availability of the workloads to meet performance requirements for the virtual computing device;

receiving input parameters for computing the workload placement plan for migrating the plurality of virtual machines, wherein the input parameters are based on predicted parameters, and, wherein the predicted parameters are based on computation of new operating locations of the virtual computing device that is performed when the virtual computing device not operating, and hypervisors of the virtual computing device are operating in maintenance operating mode;

determining the workload placement plan that forms basis for migrating the plurality of virtual machines, within the virtual computing device, for maximizing operating objectives of the virtual computing device, wherein a user specifies maximum overcommit thresholds for various resources of the virtual computing device for placing the workloads;

determining resource overcommit thresholds for the operating objectives of the virtual computing device, wherein the workload placement plan is based on a workload dependency priority structure for optimizing the optimal plan, for maximizing the workload balancing of a virtual computing device, during the maintenance of the plurality of hypervisors of the virtual computing device;

generating a migration plan, based on the determined resource overcommit threshold, for the virtual machines of the virtual computing device to at least one location of a plurality of hypervisors during maintenance of the plurality hypervisors of the virtual computing device, wherein the determined resource overcommit threshold is based on computation heterogeneous hardware in a resource pool of the virtual machine, wherein the computation of the new operating locations is performed when the virtual computing device is operating in maintenance operating mode; and executing the generated migration plan to migrate the virtual computing device to a new hypervisor within the plurality of hypervisors.

2. The computer-implemented method according to claim 1, wherein the receiving input parameters step, further including the step of:

receiving inputs of the predicted parameters, for computing the workload placement plan, for migrating the plurality of virtual machines, wherein the predicted parameters predicts demand for computing resources of the plurality of virtual machines, within the virtual computing device.

3. The computer-implemented method according to claim 1, wherein the system resource thresholds of the workload placement plan, are based on hardware or software resource thresholds of the virtual computing device, and operating size of the virtual machines that meet performance requirements of the virtual computing device.

4. The computer-implemented method according to claim 3, wherein the workload placement plan specifies maximum resource overcommitted thresholds, during migration of the plurality of virtual machines to a plurality of hypervisors of the virtual computing device.

5. The computer-implemented method according to claim 1, wherein determination of the workload placement plan, for migration of the plurality of virtual machines, of the virtual computing device is based on a detection of redundant operational metrics of the plurality of virtual machines.

6. The computer-implemented method according to claim 1, wherein the computation of the workload placement plan includes heterogeneous hardware for placement of the plurality of the virtual machines.

7. A computer system for computing an optimal plan for rebalancing workload of a virtual computing device, for maximizing availability of the workload, operating on the virtual computing device, in the event of maintenance of a plurality hypervisors, of the virtual computing device to minimize scheduled downtime of an integrated server system environment during maintenance of a host or a hypervisor of the plurality of hypervisors associated with the integrated server system environment, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to determine a workload placement plan that migrates a plurality of virtual machines of the virtual computing device to at least one location of a plurality of hypervisors during maintenance of the plurality hypervisors of the virtual computing device, based on workload structure and redundancy information of the plurality of virtual machines and business priority information of the workload structure, of the virtual computing device;

program instructions receive input parameters for computing the workload placement plan for migrating the plurality of virtual machines, wherein the input parameters are based on predicted parameters, and, wherein the predicted parameters are based on computation of new operating locations of the virtual computing device that is performed when the virtual computing device not operating, and hypervisors of the virtual computing device are operating in maintenance operating mode;

program instructions to determine the workload placement plan that forms basis for migrating the plurality of virtual machines, within the virtual computing device, for maximizing operating objectives of the virtual computing device, wherein a user specifies maximum overcommit thresholds for various resources of the virtual computing device for placing the workloads;

program instructions to determine resource overcommit thresholds for the operating objectives of the virtual computing device, wherein the workload placement plan is based on a workload dependency priority structure for optimizing the optimal plan, for maximizing the workload balancing of a virtual computing device, during the maintenance of the plurality of hypervisors of the virtual computing device;

program instructions to generate a migration plan, based on the determined resource overcommit threshold, for the virtual machines of the virtual computing device to at least one location of a plurality of hypervisors during maintenance of the plurality hypervisors of the virtual computing device, wherein the determined resource overcommit threshold is based on computation heterogeneous hardware in a resource pool of the virtual machine, wherein the computation of the new operating locations is performed when the virtual computing device is operating in maintenance operating mode; and
program instructions to execute the generated migration plan to migrate the virtual computing device to a new hypervisor within the plurality of hypervisors.

8. The computer system of claim 7, wherein program instructions to program instructions receive input parameters for computing the workload placement plan for migrating the plurality of virtual machines, further includes: program instructions to receive inputs of the predicted parameters, for computing the workload placement plan, for migrating the plurality of virtual machines, wherein the predicted parameters predicts demand for computing resources of the plurality of virtual machines, within the virtual computing device.

9. The computer system according to claim 7, wherein the system resource thresholds of the workload placement plan, are based on hardware or software resource thresholds of the virtual computing device, and operating size of the virtual machines that meet performance requirements of the virtual computing device.

10. The computer system according to claim 7 wherein the workload placement plan specifies maximum resource overcommitted thresholds, during migration of the plurality of virtual machines to a plurality of hypervisors of the virtual computing device.

11. The computer system according to claim 7, wherein determination of the workload placement plan, for migration of the plurality of virtual machines, of the virtual computing device is based on a detection of redundant operational metrics of the plurality of virtual machines.

12. A computer program product for computing an optimal plan for rebalancing workload of a virtual computing device, for maximizing availability of the workload, operating on the virtual computing device, in the event of maintenance of a plurality hypervisors, of the virtual computing device, of the virtual computing device to minimize scheduled downtime of an integrated server system environment during maintenance of a host or a hypervisor of the plurality of hypervisors associated with the integrated server system environment, the computer program product comprising:
    a non-transitory computer readable storage medium and program instructions stored on at least one of the one or more storage devices, the program instructions comprising:
    program instructions to determine a workload placement plan that migrates a plurality of virtual machines of the virtual computing device to at least one location of a plurality of hypervisors during maintenance of the plurality hypervisors of the virtual computing device, based on workload structure and redundancy information of the plurality of virtual machines and business priority information of the workload structure, of the virtual computing device;
    program instructions receive input parameters for computing the workload placement plan for migrating the plurality of virtual machines, wherein the input parameters are based on predicted parameters, and, wherein the predicted parameters are based on computation of new operating locations of the virtual computing device that is performed when the virtual computing device not operating, and hypervisors of the virtual computing device are operating in maintenance operating mode;
    program instructions to determine the workload placement plan that forms basis for migrating the plurality of virtual machines, within the virtual computing device, for maximizing operating objectives of the virtual computing device, wherein a user specifies maximum overcommit thresholds for various resources of the virtual computing device for placing the workloads;
    program instructions to determine resource overcommit thresholds for the operating objectives of the virtual computing device, wherein the workload placement plan is based on a workload dependency priority structure for optimizing the optimal plan, for maximizing the workload balancing of a virtual computing device, during the maintenance of the plurality of hypervisors of the virtual computing device;
    program instructions to generate a migration plan, based on the determined resource overcommit threshold, for the virtual machines of the virtual computing device to at least one location of a plurality of hypervisors during maintenance of the plurality hypervisors of the virtual computing device, wherein the determined resource overcommit threshold is based on computation heterogeneous hardware in a resource pool of the virtual machine, wherein the computation of the new operating locations is performed when the virtual computing device is operating in maintenance operating mode; and
    program instructions to execute the generated migration plan to migrate the virtual computing device to a new hypervisor within the plurality of hypervisors.

13. The computer program product according to claim 12, wherein program instructions to program instructions receive input parameters for computing the workload placement plan for migrating the plurality of virtual machines, further includes: program instructions to receive inputs of the predicted parameters, for computing the workload placement plan, for migrating the plurality of virtual machines, wherein the predicted parameters predicts demand for computing resources of the plurality of virtual machines, within the virtual computing device.

14. The computer program product according to 12, wherein the workload placement plan specifies maximum resource overcommitted thresholds, during migration of the plurality of virtual machines to a plurality of hypervisors of the virtual computing device.

* * * * *